(12) United States Patent
Cabrero et al.

(10) Patent No.: US 6,260,075 B1
(45) Date of Patent: Jul. 10, 2001

(54) SYSTEM AND METHOD FOR PROVIDING SHARED GLOBAL OFFSET TABLE FOR COMMON SHARED LIBRARY IN A COMPUTER SYSTEM

(75) Inventors: Jose E. Cabrero; Ian M. Holland, both of Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/491,660

(22) Filed: Jun. 19, 1995

(51) Int. Cl.⁷ .............................. G06F 9/46; G06F 15/163; G06F 9/00; G06F 12/02
(52) U.S. Cl. ............................................ 709/310; 711/221
(58) Field of Search .................... 395/700, 828, 395/561, 710, 376; 709/310–332; 711/213, 221

(56) References Cited

U.S. PATENT DOCUMENTS

| | | | |
|---|---|---|---|
| 5,247,678 | * 9/1993 | Littleton | 395/685 |
| 5,291,601 | 3/1994 | Sands . | |
| 5,339,422 | 8/1994 | Brender et al. . | |
| 5,369,766 | 11/1994 | Nakano et al. . | |
| 5,379,431 | 1/1995 | Lemon et al. . | |
| 5,404,529 | 4/1995 | Chernikoff et al. . | |
| 5,414,854 | * 5/1995 | Heninger et al. | 395/700 |
| 5,481,719 | * 1/1996 | Ackerman et al. | 395/700 |
| 5,566,346 | * 10/1996 | Andert et al. | 395/828 |
| 5,574,915 | * 11/1996 | Lemon et al. | 395/561 |
| 5,613,120 | * 3/1997 | Palay et al. | 395/710 |
| 5,822,787 | * 10/1998 | Zucker | 711/213 |
| 5,835,743 | * 11/1998 | Zucker | 712/200 |

OTHER PUBLICATIONS

IBM Technical Disclosure Bulletin, vol. 32, No. 2, Jul. 1989, A. Chang, et al., "Dynamic Binding of Executables at Run Time on the IBM RT–PC".

IBM Technical Disclosure Bulletin, vol. 33, No. 1B, Jun. 1990, D. R. Geisler et al., "Method of Dynamically Allocating Shared Memory".

IBM Technical Disclosure Bulletin, vol. 34, No. 4A, Sep. 1991, P. P. Giangarra et al., "Memory Protection Software Facility for OS/2 Shared Data Applications".

Michael Goulde, "Tomorrow's microkernel–based unix operating systems", Open Information Systems, v8, n8, p3(14), Aug. 1993.*

Seltzer, Larry, Workplace OS will change OS/2 development; PC Week, v11, n21, p(79)1. May 30, 1994.*

Seltzer, Larry; "Workplace OS details emerge"; PC Week v11, n20 p121(2); May 23, 1994.*

Pountain, 'The Chorus Micro Kernel', Byte Jan. 1994.*

Hayes, 'Personality Plus', Byte, Jan. 1994.*

(List continued on next page.)

*Primary Examiner*—Majid A. Banankhah
*Assistant Examiner*—P. G. Caldwell
(74) *Attorney, Agent, or Firm*—Jeffrey S. LaBaw; Felsman, Bradley, Vaden, Gunter & Dillion, LLP

(57) ABSTRACT

A computer system employing a microkernel executes two different tasks, e.g., operating systems, yet uses common shared libraries. Rather than each task setting up its own libraries, during compile a global offset table is set up for each task so that the tasks can use common shared libraries. An abstractions layer is established to allow the tasks to share the global offset table, and thus to use common shared libraries. Threading package related services are resolved via the abstractions mechanism. This abstractions mechanism includes services implemented as operating system abstractions, and include thread creation, exit from a thread, etc. Abstracted functions utilize pointers to runtime environment-specific functions, and are utilized by the task's runtime environment.

11 Claims, 4 Drawing Sheets

OTHER PUBLICATIONS

Varhol, 'Small Kernels Hit It Big' Jan. 1994.*

Thompson et al, Apple, IBM Bring Power PC to Desktop, Byte, Apr. 9.*

Williams, T., "Distributed real–time Unix builds on micro-kernel technology" Coputer Design v31 m n3, p6292), Mar. 1992.*

* cited by examiner

```
typedef int32     thread_id_t;
kern_return_t     CslThreadCreate(
                      thread_id_t *      tid,
                      mach_port_t *      tport,
                      size_t             stacklen,
                      ulong              (*startaddr)(void *),
                      void *             arg,
                      uint32             flags
                  );

#define CSL_THREAD_SUSPENDED    1
``` where:

tid        returns the new thread's id.
tport      returns the new thread's thread_self() port
stacklen   specifies the minimum stack size
startaddr  pointer to starting function
arg        opaque argument to starting function
flags      0 = running thread; 1 = suspended

Fig. 4

```
void    CslThreadCreateInit(kern_return_t(*ThreadCreateFunc)(
                            thread_id_t*    tid,
                            mach_port_t*    tport,
                            size_t          stacklen,
                            ulong           (*start)(void *),
                            void *          arg,
                            uint32          flags));

void    CslThreadExitInit(void (*ThreadExitFunc)(ulong status));
void    CslThreadGetIdInit(thread_id_t(*ThreadGetIdFunc)(void));
void    CslThreadGetStackInit(void *(*ThreadGetStackFunc)(void));
void    CslThreadGetStackSizeInit(size_t(*ThreadGetStackSizeFunc)(void));
void    CslThreadAtExitInit(boolean_t(*ThreadAtExitFunc)(void (*handler)(ulong));
```

Fig. 5

SYSTEM AND METHOD FOR PROVIDING SHARED GLOBAL OFFSET TABLE FOR COMMON SHARED LIBRARY IN A COMPUTER SYSTEM

BACKGROUND OF THE INVENTION

1. Technical Field

The present invention relates to data processing systems and more particularly relates to improvements in operating systems for data processing systems.

2. Description of the Related Art

A general-purpose computer has an operating system (software) to run other programs. Operating systems perform basic tasks, such as recognizing input from the keyboard, sending output to the display screen, keeping track of files and directories on the disk and controlling peripheral devices such as disc drives and printers. For more complex systems, the operating system has other responsibilities such as making sure that different programs and users running at the same time do not interfere with each other.

Operating systems can be multi-user, multi-processor, multi-tasking, and real-time in operation. A multi-user operating system allows two or more users to run programs at the same time. A multi-processing OS allows a single user to run two or more programs at the same time, where each program being executed is called a process. Usually, a multi-processing system supports more than one user. A multi-tasking OS allows a single process to run more than one task. Often, the terms multi-tasking and multi-processing are used interchangeably, even though they have slightly different meanings. Multi-tasking is the ability to execute more than one task at the same time, a task being a program. In multi-tasking only one central processing unit is involved, but it switches from one program to another so quickly that it gives the appearance of executing all of the programs at the same time. The OS/2™ and UNIX™ operating systems use multi-tasking. Multi-processing systems are much more complicated than single-purpose systems because the operating system must allocate resources to competing processes in a reasonable manner. A real-time operating system responds to input instantaneously. General purpose operating systems such as DOS and UNIX are not real-time.

Operating systems provide a software platform on top of which application programs can run. The application programs must be specifically written to run on top of a particular operating system. The choice of the operating system therefore determines to a great extent the applications which can be run. For IBM compatible personal computers, example operating systems are DOS, OS/2™, AIX™, and XENIX™.

A user normally interacts with the operating system through a set of commands. For example, the DOS operating system contains commands such as COPY and RENAME for copying files an changing the names of files, respectively. The commands are accepted and executed by a part of the operating system called the command processor or command line interpreter.

There are many different operating systems for personal computers such as CP/M™, DOS, OS/2™, UNIX™. DOS runs on all IBM compatible personal computers and is a single user, single tasking operating system. OS/2, a successor to DOS, is a relatively powerful operating system that runs on IBM compatible personal computers that use the Intel 80286 or later microprocessor. OS/2 is generally compatible with DOS but contains many additional features; for example, it is multi-tasking and supports virtual memory. UNIX and UNIX-based AIX run on a wide variety of personal computers and work stations. UNIX and AIX have become standard operating systems for work stations and are powerful multi-user, multi-processing operating systems.

In 1981 when the IBM personal computer was introduced, the DOS operating system occupied approximately 10 kilobytes of storage. Since that time, personal computers have become much more complex and require much larger operating systems. Today, for example, the OS/2 operating system for the IBM personal computers can occupy as much as 22-megabytes of storage. Personal computers become ever more complex and powerful and it is apparent that the operating systems cannot continually increase in size and complexity without imposing a significant storage penalty on the storage devices associated with those systems.

It was because of this untenable growth rate in operating system size, that the MACH project was conducted at the Carnegie Mellon University in the 1980s. The goal of that research was to develop a new operating system that would allow computer programmers to exploit modern hardware architectures emerging and yet reduce the size and the number of features in the kernel operating system. The kernel is the part of an operating system that performs basic functions such as allocating hardware resources. In the case of the MACH kernel, five programming abstractions were established as the basic building blocks for the system. They were chosen as the minimum necessary to produce a useful system on top of which the typical complex operations could be built externally to the kernel. The Carnegie Mellon MACHkernel was reduced in size in its release 3.0, and is a fully functional operating system called the MACH microkernel. The MACH microkernel has the following primitives: the task, the thread, the port, the message, and the memory object.

The task is the traditional UNIX process which is divided into two separate components in the MACH microkernel. The first component is the task, which contains all of the resources for a group of cooperating entities. Examples of resources in a task are virtual memory and communications ports. A task is a passive collection of resources; it does not run on a processor.

The thread is the second component of the UNIX process, and is the active execution environment. Each task may support one or more concurrently executing computations called threads. For example, a multi-threaded program may use one thread to compute scientific calculations while another thread monitors the user interface. A MACH task may have many threads of execution, all running simultaneously. Much of the power of the MACH programming model comes from the fact that all threads in a task share the task's resources. For instance, they all have the same virtual memory address space. However, each thread in a task has its own private execution state. This state consists of a set of registers, such as general purpose registers, a stack pointer, a program counter, and a frame pointer.

A port is the communications channel through which threads communicate with each other. A port is a resource and is owned by a task. A thread gains access to a port by virtue of belonging to a task. Cooperating programs may allow threads from one task to gain access to ports in another task. An important feature is that they are location transparent. This capability facilitates the distribution of services over a network without program modification.

The message is used to enable threads in different tasks to communicate with each other. A message contains collections of data which are given classes or types. This data can range from program specific data such as numbers or strings to MACH-related data such as transferring capabilities of a port from one task to another.

A memory object is an abstraction which supports the capability to perform traditional operating system functions in user level programs, a key feature of the MACH microkernel. For example, the MACH microkernel supports virtual memory paging policy in a user level program. Memory objects are an abstraction to support this capability.

All of these concepts are fundamental to the MACH microkernel programming model and are used in the kernel itself. These concepts and other features of the Carnegie Mellon University MACH microkernel are described in the book by Joseph Boykin, et al., "Programming Under MACH," Addison Wessely Publishing Company, Incorporated, 1993.

Additional discussions of the use of a microkernel to support a UNIX personality can be found in the article by Mike Accetta et al., "MACH: A New Kernel Foundation for UNIX Development," Proceeding of the Summer 1986 USENIX Conference, Atlanta, Ga. Another technical article on the topic is by David Golub, et al., "UNIX as an Application Program," Proceedings of the Summer 1990 USENIX Conference, Anaheim, Calif.

SUMMARY OF THE INVENTION

It is an object of the invention to provide an improved microkernel architecture for a data processing system.

A computer system employing a microkernel executes two different tasks, e.g., operating systems, yet uses common shared libraries. Rather than each task setting up its own libraries, during compile a global offset table is set up for each task so that the tasks can use common shared libraries. An abstractions layer is established to allow the tasks to share the global offset table, and thus to use common shared libraries. Threading package related services are resolved via the abstractions mechanism. This abstractions mechanism includes services implemented as operating system abstractions, and include thread creation, exit from a thread, etc. Abstracted functions utilize pointers to runtime environment-specific functions, and are utilized by the task's runtime environment.

DESCRIPTION OF THE FIGURES

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a program listing of a thread_resume( ) function used in the system of FIG. 2 having a common shared library; and FIG. 5 is a program listing of a abstraction layer initialization functions, used in the system of FIG. 2.

DESCRIPTION OF A PREFERRED EMBODIMENT

The Microkernel System

Figure 1:
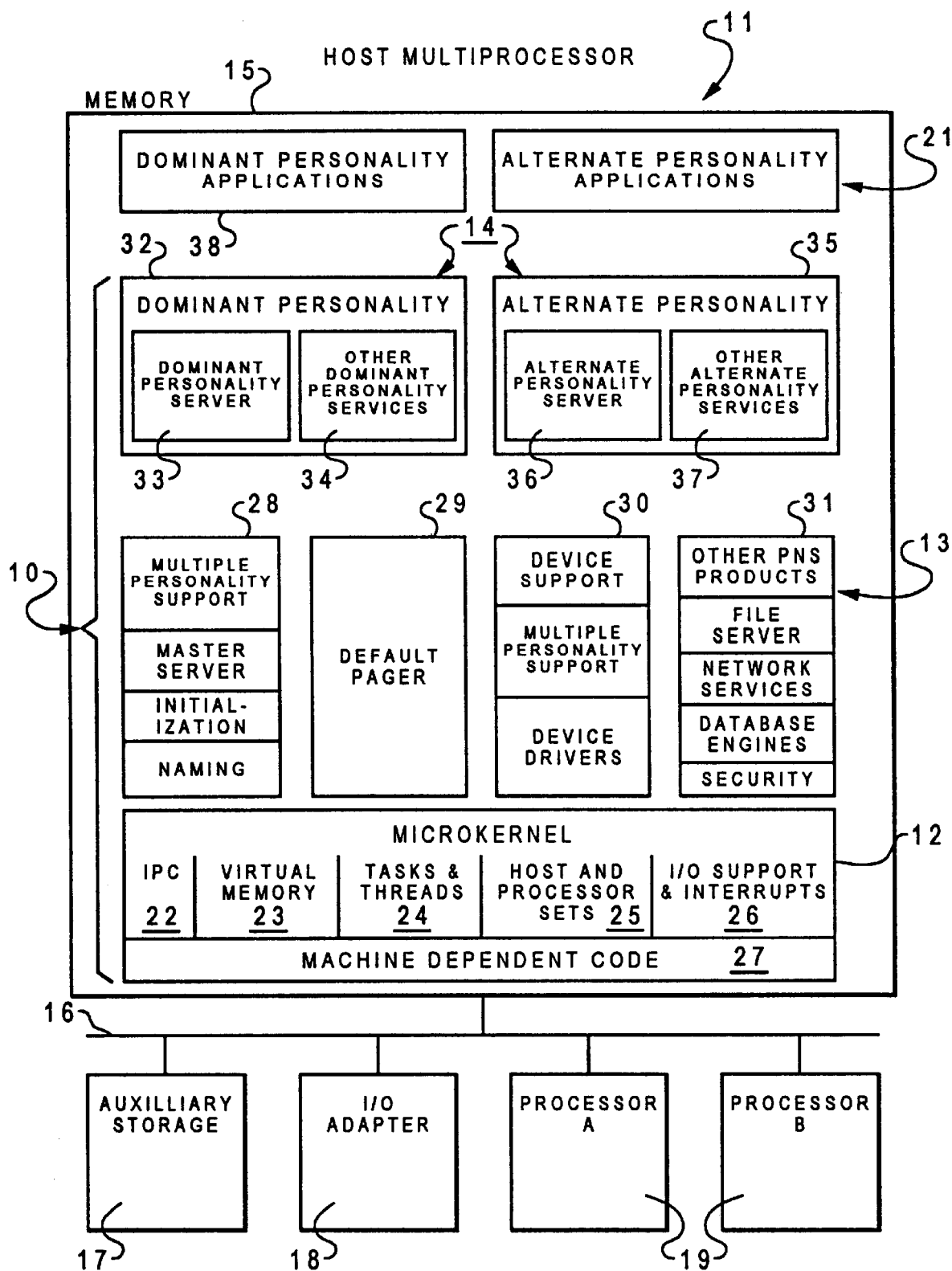
FIG. 1 is a functional block diagram of a microkernel system in the memory of a host multi-processor, showing how the microkernel and personality-neutral services run multiple operating system personalities on a variety of hardware platforms.

FIG. 1 is a functional block diagram of a software system which is referred to as the microkernel system, executing on a host multi-processor 11, showing how the microkernel 12 and personality-neutral services 13 run multiple operating system personalities 14 on a variety of hardware platforms.

This microkernel technology is a way to structure systems software to reduce its complexity and increase the range of hardware and system configurations that are supported by an operating system implementation. Instead of creating a single, monolithic system, developers create a set of servers that can be configured together in a number of ways to provide a variety of target operating environments. In addition, the microkernel lets multiple operating environments execute together on a single hardware system. The microkernel introduces the idea that a small, message-based piece of systems software running in the most privileged state of a computer can support the rest of the operating system as a set of server programs.

The host multi-processor 11 shown in FIG. 1 includes memory 15 (i.e., the software system is executing from memory 15) connected by means of a bus 16 to an auxiliary storage 17 which can be, for example, a disc drive, a read-only or a read/write optical storage, or any other bulk storage device. Also connected to the bus 16 is the I/O adaptor 18, which, in turn, may be connected to a keyboard, a monitor display, a telecommunications adaptor, a local area network adaptor, a modem, multimedia interface devices, or other I/O devices. Also connected to the bus 16 are first and second processors 19. The example shown in FIG. 1 is of a symmetrical multi-processor configuration wherein the two uni-processors 19 share a common memory address space 15. Other configurations of single or multiple processors can be shown as equally suitable examples. The processors 19 can be, for example, an Intel 386™ CPU, Intel 486™ CPU, a Pentium™ processor, a Power PC™ processor, or other uni-processor devices.

The memory 15 includes the microkernel system 10 stored therein, which comprises the microkernel 12, the personality-neutral services (PNS) 13, and the personality servers 14. The microkernel system 10 serves as the operating system for the application programs 21 stored in the memory 15.

A feature of the microkernel is providing an operating system that behaves like a traditional operating system such as UNIX or OS/2. In other words, the operating system has the personality of OS/2 or UNIX, or some other traditional operating system.

The microkernel 12 contains a small, message-passing nucleus of system software running in the most privileged state of the host multi-processor 11, that controls the basic operation of the machine. The microkernel system 10 includes the microkernel 12 and a set of servers and device drivers that provide personality-neutral services 13. As the name implies, the personality neutral servers and device drivers are not dependent on any personality such as UNIX or OS/2. They depend on the microkernel 12 and upon each other. The personality servers 14 use the message-passing services of the microkernel 12 to communicate with the personality-neutral services 13. For example, UNIX, OS/2 or any other personality server can send a message to a personality-neutral disk driver and ask it to read a block of data from the disk. The disk driver reads the block and returns it in a message. The message system is optimized so that large amounts of data are transferred rapidly by manipulating pointers; the data itself is not copied.

By virtue of its size and ability to support standard programming services and features as application programs, the microkernel 12 is simpler than a standard operating system. The microkernel system 10 is broken down into modular pieces that are configured in a variety of ways, permitting larger systems to be built by adding pieces to the smaller ones. For example, each personality-neutral server 13 is logically separate and can be configured in a variety of ways. Each server runs as an application program and can be debugged using application debuggers. Each server runs in a separate task and errors in the server are confined to that task.

FIG. 1 shows the microkernel 12 including the interprocess communications module (IPC) 22, the virtual memory module 23, tasks and threads module 24, the host and processor sets 25, I/O support and interrupts 26, and machine dependent code 27.

The personality-neutral services 13 shown in FIG. 1 include the multiple personality support 28 which includes the master server, initialization, and naming. It also includes the default pager 29 and the device support 30 which includes multiple personality support and device drivers. It further includes other personality-neutral products 31, including a file server, network services, database engines and security.

The personality servers 14 are, for example, the dominant personality 32 which can be, for example, a UNIX personality. It includes a dominant personality server 33 which would be a UNIX server, and other dominant personality services 34 which would support the UNIX dominant personality. An alternate dominant personality 35 can be, for example, OS/2. Included in the alternate personality 35 are the alternate personality server 36 which would characterize the OS/2 personality, and other alternate personality services 37 (for OS/2).

Dominant personality applications 28 shown in FIG. 1, associated with the UNIX dominant personality example, are UNIX-type applications which would run on top of the UNIX operating system personality 32. The alternate personality applications 39 shown in FIG. 1, are OS/2 applications which run on top of the OS/2 alternate personality operating system 35.

FIG. 1 shows that the microkernel system 10 carefully splits its implementation into code that is completely portable from processor type to processor type and code that is dependent on the type of processor in the particular machine on which it is executing. It also segregates the code that depends on devices into device drivers; however, the device driver code, while device dependent, is not necessarily dependent on the processor architecture. Using multiple threads per task, it provides an application environment that permits the use of multi-processors without requiring that any particular machine be a multi-processor. On uniprocessors, different threads run at different times. All of the support needed for multiple processors is concentrated into the small and simple microkernel 12.

This microkernel system 10 is a unique foundation for operating systems and provides a comprehensive environment for operating system development with the following features: support for multiple personalities; extensible memory management; interprocess communication; multi-threading; and multi-processing. The microkernel system 10 provides a set of kernel services implemented as a pure kernel and an extensive set of services for building operating system personalities implemented as a set of user-level servers.

The objectives of the microkernel system 10 include the following:
(a) permit multiple operating system personalities to work together in harmony;
(b) provide common programming for low-level system elements, such as device drivers and file systems;
(c) exploit parallelism in both operating system and user applications;
(d) support large, potentially sparse address spaces with flexible memory sharing;
(e) allow transparent network resource access;
(f) be compatible with existing software environments, such as OS/2 and UNIX; and
(g) portable (to 32-bit and 64-bit platforms).

The microkernel system 10 is based on the following concepts:
(a) user-mode tasks performing many traditional operating system functions (for example, file system and network access);
(b) a basic set of user-level run-time services for creating operating systems.
(c) a simple, extensible communication kernel;
(d) an object basis with communication channels as object references; and
(e) a client/server programming model, using synchronous and asynchronous inter-process communication.

A feature of the microkernel system 10 is to provide a simple, extensible communication kernel. It is an objective of the microkernel system 10 to permit the flexible configuration of services in either user or kernel space with the minimum amount of function in the kernel proper. The kernel must provide other support besides task-to-task communication, including:
(a) management of points of control (threads);
(b) resource assignment (tasks);
(c) support of address spaces for tasks; and
(d) management of physical resources, such as physical memory, processors, interrupts, DMA channels, and clocks.

User-mode tasks implement the policies regarding resource usage. The kernel simply provides mechanisms to enforce those policies. Logically above the kernel is the personality-neutral services 13 (PNS) layer. The PNS 13 provide a C run-time environment, including such basic constructs as string functions, and a set of servers which include: Name Server—allows a client to find a server; and Master Server—allows programs to be loaded and started.

One feature of the microkernel system 10 is to minimize abstractions provided by the kernel itself, but not to be minimal in the semantics associated with those abstractions. Each of the abstractions provided have a set of semantics associated with it, and a complex set of interactions with the other abstractions. The main kernel abstractions are:
(a) Task—Unit of resource allocation, large access space and port right
(b) Thread—Unit of CPU utilization, lightweight (low overhead)
(c) Port—A communication channel, accessible only through the send/receive capabilities or rights
(d) Message—A collection of data objects
(e) Memory object—The internal unit of memory management The microkernel system 10 does not provide the traditional concept of process because all operating system environments have considerable semantics associated with a process (such as user ID, signal state, and so on). It is not the purpose of the microkernel to understand or provide these extended semantics. Many systems equate a process with an execution point of control; some systems do not.

The microkernel 12 supports multiple points of control separately from the operating system environment's process. The microkernel provides the following two concepts: (a) Task and (b) Thread.

The kernel provides some memory management; memory is associated with tasks, and memory objects are the means by which tasks take control over memory management. The microkernel system 10 provides the mechanisms to support large, potentially sparse virtual address spaces. Each task has an associated address map (separate from the address maps for the other tasks, i.e., a separate address space) that is maintained by the kernel and controls the translation of virtual address in the task's address space into physical addresses. As in virtual memory systems, the contents of the entire address space of any given task might not be completely resident in physical memory at the same time, and mechanisms must exist to use physical memory as a cache for the virtual address spaces of tasks. Unlike traditional virtual memory designs, the microkernel system 10 does not implement all of the caching itself. It gives user mode tasks the ability to participate in these mechanisms. The PNs include a user task, the default pager 29, that provides paging services for memory.

Unlike other resources in the microkernel system 10, virtual memory is not referenced using ports. Memory can be referenced only by using virtual addresses as indices into a particular task's address space. The memory and the associated address map that defines a task's address space can be partially shared with other tasks. A task can allocate new ranges of memory within its address space, de-allocate them, and change protections on them. It can also specify inheritance properties for the ranges. A new task is created by specifying an existing task as a base from which to construct the address space for the new task. The inheritance attribute of each range of the memory of the existing task determines whether the new task has that range defined and whether that range is virtually copied or shared with the existing task.

Any given region of memory is backed by a memory object. A memory manager task provides the policy governing the relationship between the image of a set of pages while cached in memory (the physical memory contents of a memory region) and the image of that set of pages when not cached (the abstract memory object). The PNS 13 has a default memory manager or pager 29 that provides basic non-persistent memory objects that are zero-filled initially and paged against system paging space.

The microkernel system 10 uses a client/server system structure in which tasks (clients) access services by making requests of other tasks (servers) through messages sent over a communication channel. Since the microkernel 12 provides very few services of its own (for example, it provides no file service), a microkernel 12 task must communicate with many other tasks that provide the required services. The communication channels of the interprocess communication (IPC) mechanism are called ports. A message is a collection of data, memory regions, and port rights. A port right is a name by which a task, that hods the right, names the port. A task can manipulate a port only if it holds the appropriate port rights. Only one task can hold the receive right for a port. This task is allowed to receive (read) messages form the port queue. Multiple tasks can hold send rights to the port that allow them to send (write) messages into the queue. A task communicates with another task by building a data structure that contains a set of data elements, and then performing a message-send operation on a port for which it holds a send right. At some later time, the task holding the receive right to that port performs a message-receive operation. This message transfer is an asynchronous operation. The message is logically copied into the receiving task (possibly with copy-on-write optimizations). Multiple threads within the receiving task can be attempting to receive messages from a given port but only one thread will receive any given message.

Common Shared Libraries

Figure 2:
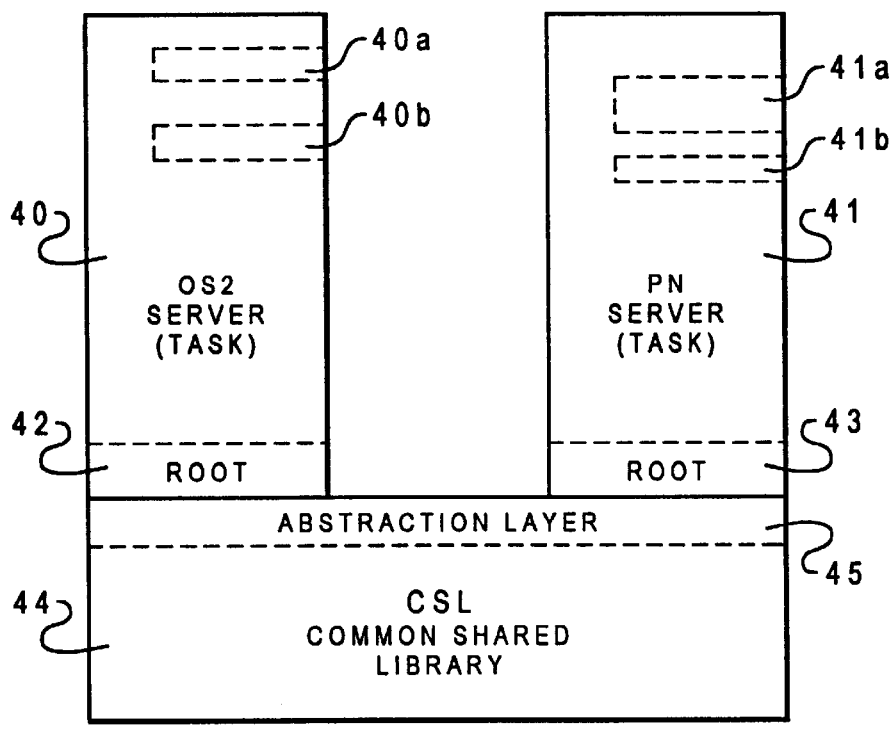
FIG. 2 is a diagram of a software system operating on the system of FIG. 1, with an OS2 task and a personality neutral task using a common shared library, according to one embodiment of the invention.

Referring to FIG. 2, multiple tasks may be executed by the CPU or host multiprocessor 11 under the operating system which supports multiple tasks. For example, an OS2 task 40 and a "personality neutral" or PN task 41 may be executing at the same time. A personality neutral task is one that has no "personality," i.e., not like that provided by OS2 or Unix, for example. File system servers or networking servers are examples of personality neutral tasks. However, a Unix server (or other OS) itself may be implemented in a personality neutral manner. Referring to FIG. 2, the OS2 task 40 which is indeed an OS2 server (i.e., as if it were the OS2 operating system itself, although here it is being executed over the microkernel 12 as a dominant personality server 33), has generated applications tasks 40a and 40b. Likewise, as represented in FIG. 2, the task 41 which may indeed be a Unix server (i.e., as if it were the OS2 operating system itself, although here it is being executed over the microkernel 12 as an alternate personality server 36), has generated applications tasks 41a and 41b. The task 40 includes a root 42 and the task 41 includes a root 43. The root of a task is that portion of the program that is aware of its runtime environment. For example, the root of the OS2 task 40 of FIG. 2 is instrumented to the OS2 API (applications program interface), while the root of the PN task is instrumented to the microkernel run time environment API.

According to the invention, these two tasks 40 and 41 of FIG. 2, as well as the applications tasks 40a–41b, share a "common shared library" 44. An example of a common shared library is an interface library for the microkernel OS or operating system of FIG. 1. The CSL 44, because of its shared nature, e.g., its global offset table, can only be instrumented to the microkernel common services and other CSLs. In addition, since a personality such as OS2 needs to know when a thread is created and terminated, must allocate the stack for the thread, and needs to make information available about the thread, the CSL must be able to invoke runtime-dependent entry points that perform these, and possibly other, functions.

While the CSL 44 normally exports symbols which are available to the root 42 or 43 of the program and other CSLS, the reverse is not true; the tasks 40 and 41 do not export symbols which are available to the CSLs. An operating system loader, such as a workplace operating system loader which may be used in one embodiment, has certain semantics, and these semantics usually would not allow shared libraries such as CSL 44 to import symbols from the roots 40 or 41 of the tasks or programs. Therefore, not only is it necessary to define a common interface that a CSL 44 will have to use, it is also necessary to define a mechanism that allows the CSL 44 to access the common interfaces. This mechanism is called operating system abstraction or abstraction layer 45 in FIG. 2.

Figure 3:
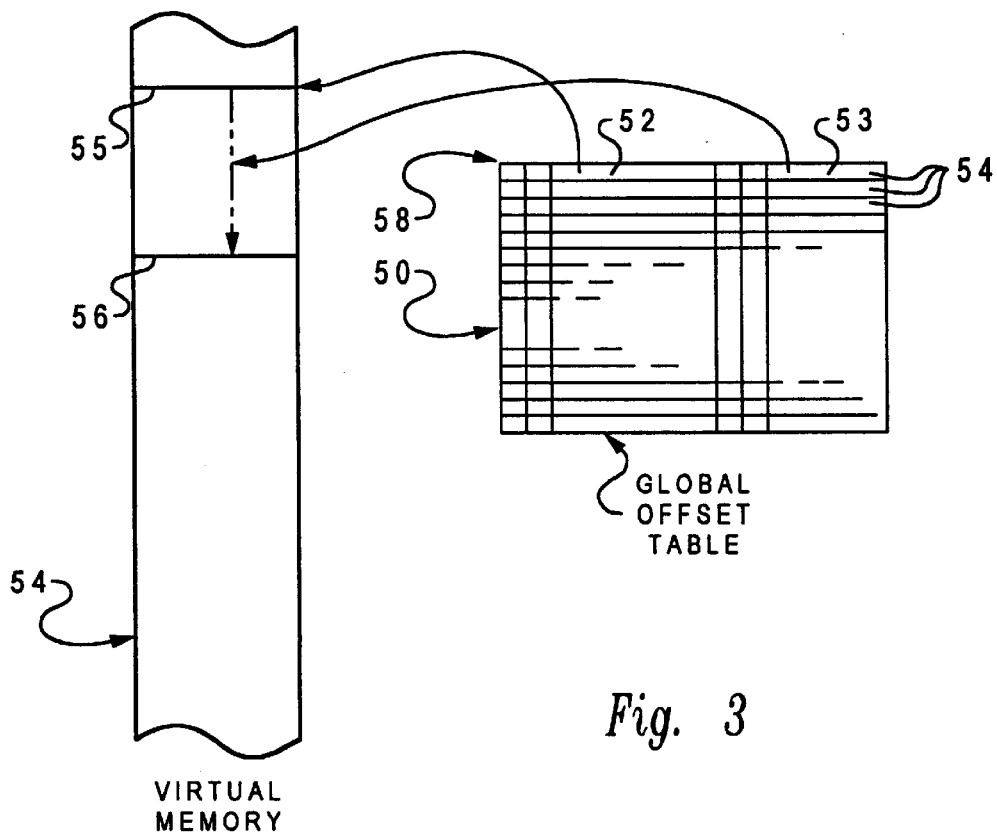
FIG. 3 is a diagram of a global offset table shared by the tasks of FIG. 2.

A global offset table or GOT is one of the data structures maintained by an operating system running a virtual memory management system. A typical GOT 50 is illustrated in FIG. 3, where this table has a number of entries 51, with each entry 51 containing a base address 52 and an offset 53, as well a various other fields. In virtual memory 54, the base address value 52 points to a particular base address 55 (which may be a segment base address, for example) and the associated offset 53 gives an offset amount 56. Various tasks 40 and 41 executing on the computer system 10 under the operating system of FIG. 1, will, according to a feature of the present invention, use the same GOT 50, instead of each having its own separate GOT. A value in each task 40 or 41 points to the address 58 of the GOT 50. The global offset table 50 is generated at compile time, then fixed-up at runtime; the first task 40a–41b which uses it sets it up in memory with particular addresses, and these remain fixed, so subsequent tasks using it will use the same addresses.

Concrete implementations provide straight-forward libraries of procedures that the user (programmer) calls directly. Abstracted functions utilize pointers to runtime-environment-specific functions. These pointers must be initialized by the task's runtime environment (operating system on a particular machine). Each runtime environment must provide wrapper routines that conform to the declarations specified by the OS abstractions. These wrapper functions, in turn, call the environment specific functions to perform the requested operation.

Services Needed by a CSL

A CSL 44 typically needs the following types of services: (a) threading-package-related services; (b) heap management; (c) error reporting/logging; (d) trace message output; (e) dynamic loader services; (f) terminal character output; (g) locks; and (h) semaphores.

In analyzing these services, it was found that many of the services need to be global in nature, i.e., provided by a centralized mechanism which, by convention, all CSLs use. Specifically, i) heap management, ii) error reporting/logging, iii) trace message output, iv) dynamic loader services, v) terminal character output, vi) locks, and vii) semaphores will be provided as concrete implementations. And so, threading-package-related services are the only items to be resolved via the OS abstractions mechanism.

While there are many threading-package-related services (the microkernel provides over twenty threading interfaces), all threading packages will be based on microkernel threads, and there will be a direct correspondence between any threading package's threads and a microkernel thread. However, not all microkernel threading interfaces can be directly invoked by a CSL 44. A number of these functions have been identified as being runtime dependent functions: (a) thread creation, (b) exit from a thread; (c) obtain the thread ID; (d) obtain the stack base of the thread; (e) obtain the stack size of the thread; and (f) add a function to the per-thread exit list.

The Abstractions

Several of the abstractions of the abstraction layer 45 will be described in the following paragraphs, as used in the microkernel system.

Thread Creation

The thread creation abstraction creates a thread in the runtime threading package with its state set such that it is runnable and starts executing at the specified entry point with the specified argument. The newly created thread may be running or suspended according to the flag parameter. Upon return of this function, the tport parameter must point to a valid port right. At a minimum, the thread_resume( ) function must work on this port such that a suspended thread can be resumed.

Thread Exit

The thread exit abstraction causes the current thread to exit. The runtime-specific threading package will process the thread's exit list upon exiting and invoke each exit handler logged there, passing as an argument the thread's exit status (see CslThreadAtExit( ) below). This function does not return:

| where: | void | CslThreadExit(ulong status); |
|---|---|---|
| Thread ID: | status | exit value |

The Thread ID abstraction returns the ID of the current thread. The thread ID should be a well-behaved number when hashing. Ideally, the thread ID is a consecutive integer starting at 0:

thread_id_t CslThreadGetId( );

Thread's Stack Base

The Thread's Stack Base call returns the base of the stack allocated by the runtime threading package to the current thread:

void* CsLThreadGetStack( );

Thread Stack Size

The Thread Stack Size call returns the actual size of the stack allocated by the threading package to the current thread:

size_t CsLThreadGetStackSize( );

Thread Exit List Processing

The Thread Exit List Processing function logs an exit handler, to be invoked upon exit from the current thread exiting, with the exit status as its only argument. This function returns FALSE if the exit handler cannot be saved:

| where: | boolean_t | CslThreadAtExit(void(*func)(ulong)); |
|---|---|---|
| | func | denotes the exit handler function. |

The OS Abstractions Mechanism

While concrete implementations provide straightforward libraries of procedure that the user can call directly, abstracted functions utilize pointers to runtime environment-specific functions. These pointers must be initialized by the task's runtime environment. Each runtime environment must provide wrapper routines that conform to the declarations given in the above description of services implemented as OS abstractions. These wrapper functions, in turn, call the environment-specific function(s) to perform the requested operation. To initialize the abstractions layer 45, the runtime environment will pass to the abstractions layer 45 pointers to these wrapper functions. It does so by calling the appropriate abstraction initialization function.

Each abstracted function is assigned one abstraction initialization function. This approach was selected to avoid the possibility of ABI incompatibilities if additional abstractions need to be added later. The alternative of providing a single abstraction initialization function, which accepts a vector of pointers to all functions, has a potential ABI incompatibility problem, so it was abandoned.

The abstractions layer initialization functions are given in FIG. 5. These functions in FIG. 5 are provided by the ABSTRACT.DLL common shared library 44. This library is linked to all tasks in the system by virtue of the fact that the initialization functions are imported by the runtime environment. Therefore, the runtime will need to include abstract.h.

Initialization of the Abstractions Layer by the PN Runtime Environment

The PN runtime environment, just like any other personality runtime environment, must initialize the abstractions layer 45 very early in the life of the task. This section describes how the PN runtime initializes the abstractions layer 45.

The system (i.e., PN) loader does not implement invocation of DLL initialization functions in the PN runtime environment. Note that these DLLs do not have dependencies on the abstractions layer. Only CSLs (Common Shared Libraries) which are shared across PN, OS/2, etc., need to be dependent on the abstractions layer 45.

There are a number of issues that need to be addressed for the PN runtime:

(a) Since the abstractions are all threading package abstractions, they should be packaged with the PN threading package, currently cthreads.

(b) There will be two initializations of the abstractions layer. The first in crt0_c.c, before invoking the (*mach_init$_{13}$ routine)( ), and the second in cthread_init( ), after completing cthread initialization of the first thread. The first initialization will simply initialize the CslThreadGetId( ) abstraction to point to a function that returns zero as the ID of the first thread. It will initialize all the other abstractions to abort the running program if invoked.

(c) The abstractions layer 45 provides an interim implementation of mig_init( ), mig_get_reply_port( ) and mig_dealloc_reply_port( ) that will be thread safe. The crt( )_c.c module will also call mig_init( ) just after the first initialization of the abstractions layer described above.

(d) Upon completing initialization of the first thread, the cthread_init( ) function will re-initialize all the abstractions to their final form. The final form of the CslThreadGetID( ) function will be consistent with the fact that the first thread's ID has been defined as ( ) by the first version of CsIThreadGetID( ).

(e) If a CSL 44 needs an initialization function to be invoked, this initialization function will be involved from crt( )_c.c, after the call to the cthread_init( ). Any problems involving the invocation order of these initialization functions, will be resolved by ordering the calls within crt( )_c.c, provided that the call to cthread_init( ) is made before any other initialization call.

The Appendix shows the code necessary to implement the abstraction functions and the initialization of the abstractions layer for the PN runtime. in addition, it also shows the mig_int( ), mig_get_reply_port( ), and mig_dealloc_reply_port( ) thread safe functions.

While the invention has been particularly shown and described with reference to a preferred embodiment, it will be understood by those skilled in the art that various changes in form and detail may be made therein without departing from the spirit and scope of the invention.

what is claimed is:

1. A method of operating a computer system, comprising the steps of:

providing a microkernel running in the most privileged state of said computer for supporting a plurality of different personality servers, at least one of said personality servers behaving like a commonly-used operating system;

generating a first applications task by one of said personality servers and a global offset table used by said first applications task; and generating a second applications task by another of said personality servers, and using said global offset table by said second applications task;

providing at least one common shared library which is shared by at least said first and second applications tasks generated by said personality servers;

providing an abstractions layer in each one of said common shared libraries and interfacing said common shared libraries with said first and second applications tasks and personality servers via a root layer of said personality servers and said abstractions layer.

2. A method of operating a computer system according to claim 1 including the steps of implementing in said abstractions layer as abstracted functions at least the services of thread creation and thread exit.

3. A method of operating a computer system according to claim 2 wherein said abstracted functions utilize pointers to runtime specific functions.

4. A method of operating a computer system according to claim 1 wherein there are two of said personality servers, one of which is for an OS2 personality and the other of which is for a personality-neutral function.

5. A method of operating a computer system according to claim 4 wherein there are at least two of said common shared libraries.

6. A computer system, comprising:

means for providing a microkernel running in the most privileged state of said computer for supporting a plurality of different personally servers, at least one of said personality servers behaving like a commonly-used operating system;

means for generating a first applications tasks by one of said personality servers and for generating a global offset table used by said first application task; and means for generating a second application task by another of said personality servers and using said global offset table by said second application task;

means for providing at least one common shared library which is shared by at least said first and second applications tasks generated by said personality servers;

means for providing an abstractions layer in each one of said common shared libraries for interfacing said common shared libraries with said personality servers and said first and second application tasks via a root layer of said personality servers and via said abstractions layer.

7. A system according to claim 6 including the steps of implementing in said abstractions layer as abstracted functions at least the services of thread creation and thread exit.

8. A system according to claim 7 wherein said abstracted functions utilize pointers to runtime specific functions.

9. A system according to claim 6 wherein there are two of said personality servers, one of which is for an OS2 personality and the other of which is for a personality-neutral function.

10. A system according to claim 9 wherein there are at least two of said common shared libraries.

11. A program product residing in computer memory in a computer system for providing operating system and common shared library services, said program product comprising:

means for providing a microkernel running in the most privileged state of said computer system for supporting a plurality of different personality servers, at least one of said personality servers behaving like a commonly-used operating system;

means for generating a first applications task by one of said personality servers and for generating a global offset table used by said first applications task; and means for generating a second applications task by another of said personality servers and using said global offset table by said second applications task;

means for providing at least one common shared library which is shared by at least said first and second applications tasks generated by said personality servers;

means for providing an abstractions layer in each one of said common shared libraries for interfacing said common shared libraries with said personality servers and said first and second applications tasks via a root layer of said personality servers and via said abstractions layer; and signal-bearing media bearing said means for providing and means for generating.

* * * * *